May 31, 1960 A. W. MALL 2,938,312
METHOD OF FABRICATING CHAIN SAW GUIDE BARS
Filed Sept. 10, 1956 2 Sheets-Sheet 1
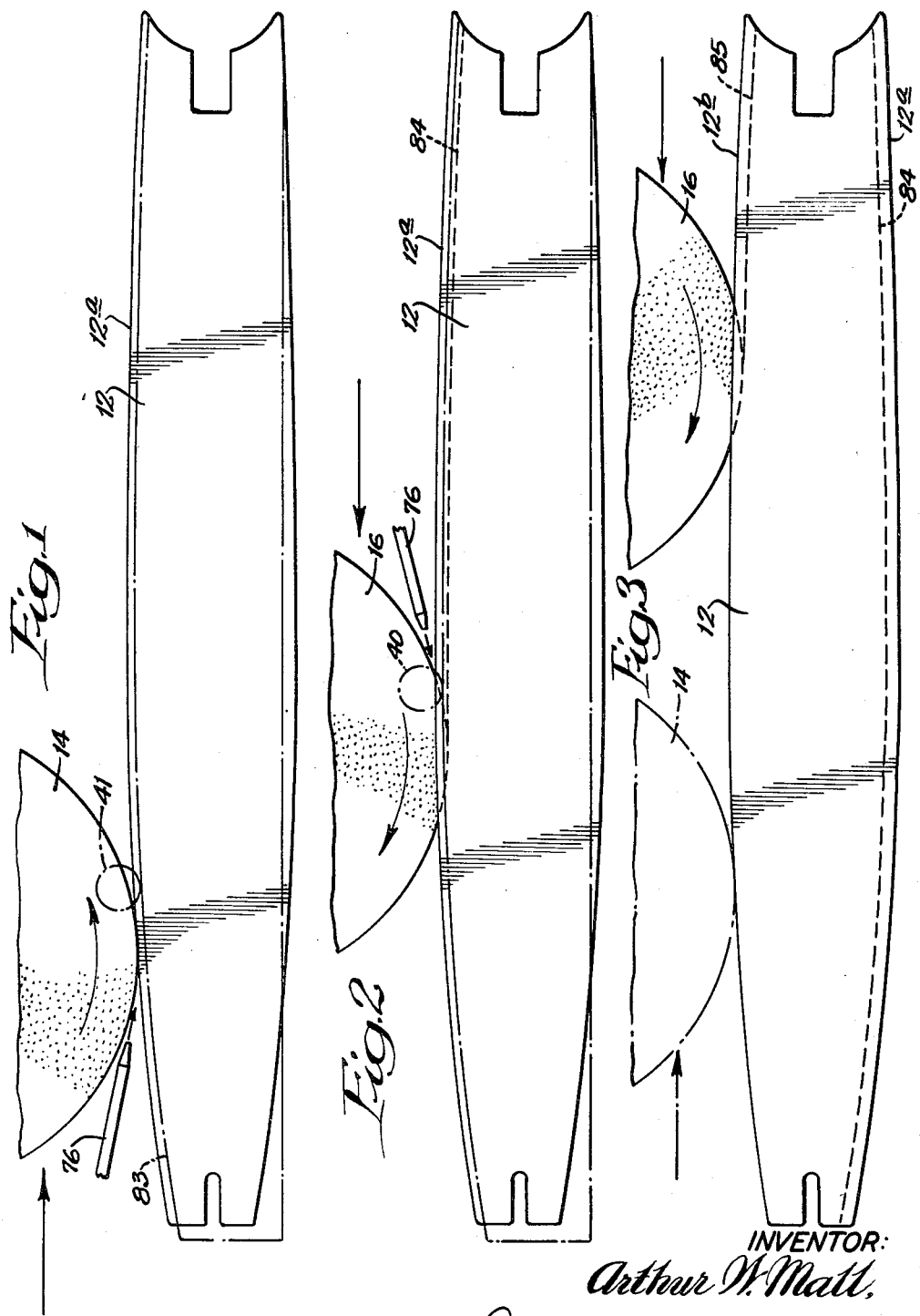
INVENTOR:
Arthur W. Mall,
BY Dawson, Tilton & Graham,
ATTORNEYS

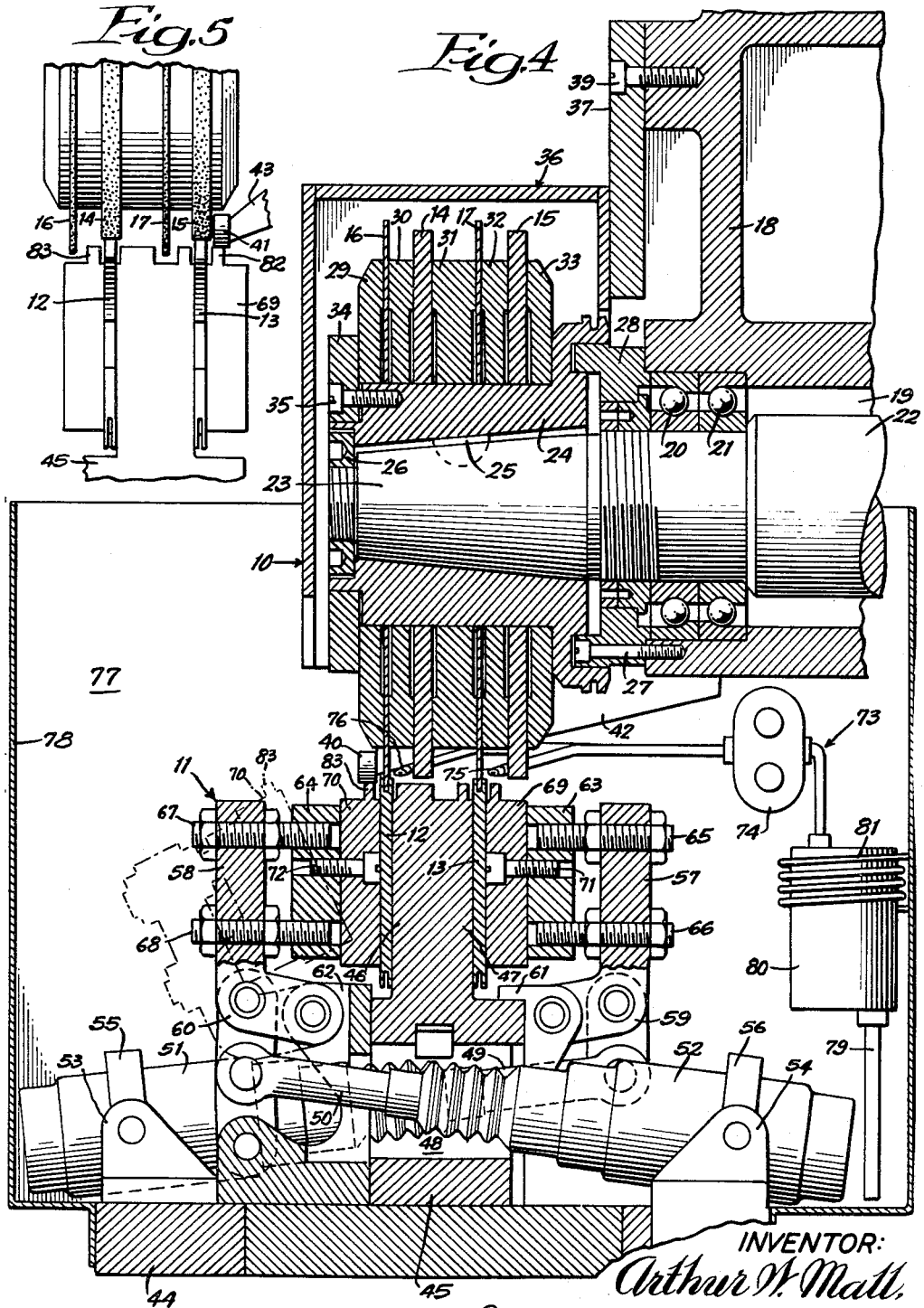

United States Patent Office 2,938,312
Patented May 31, 1960

2,938,312

METHOD OF FABRICATING CHAIN SAW GUIDE BARS

Arthur W. Mall, Flossmoor, Ill., assignor, by mesne assignments, to Remington Arms Company, Inc., Bridgeport, Conn., a corporation of Delaware Filed Sept. 10, 1956, Ser. No. 608,738

4 Claims. (Cl. 51—281)

This invention relates to a method of fabricating chain saw guide bars, and more especially to a method of contouring stock material in the manufacturing of a chain saw guide bar and for also forming the grooves therein.

The guide bar or guide plate used in a chain saw is elongated in one dimension, and the longitudinal edges thereof are provided with a curvature that tapers inwardly to define narrowed ends. In addition to this curvature or contour, the groove or slot is formed in each of the curved longitudinal edges. The endless saw chain in use travels about the guide bar and has depending portions that ride in the grooves. The bar is equipped with an idler wheel or some other means at its outer end over which the endless chain passes in changing its direction of movement.

In the past, these guide bars or guide plates have been formed by milling operations—the general procedure being, after first contouring the bar, to mill the slots or grooves in the longitudinal edges thereof, to then heat treat the bar, and thereafter straighten it. This procedure has certain disadvantages, among them being the irregular hardness particularly along the longitudinal edges thereof which resulted in brittleness that caused breakage at the thin surfaces adjacent the milled grooves. Another disadvantage is that sharp corners and tears were formed along the grooves in the milling operation which adversely influenced the heat treating of the bars, and also provided a hazard causing excessive wear and breakage of the saw chains. Yet another disadvantage is that milling the grooves is a slow operation, usually having a cutting speed of from 2 to 3 linear inches per minute.

Various alternative procedures and guide bar constructions have been proposed in an effort to overcome the disadvantages resulting from the standard prior art procedure described above. One such alternative has been the provision of a laminated bar, certain of the laminations being narrower than the others so as to form the longitudinally extending edge grooves. However, laminated bars have disadvantages of their own that have prevented their general acceptance as a commercial substitute for the milled guide bars. A need has and does exist then for an improved method of forming or fabricating the guide bars of chain saws, and it is accordingly an object of this invention to provide such a method.

Another object of the invention is that of providing both a method of contouring stock material and for forming axially extending slots in the longitudinal edges thereof, each by a grinding operation. Still another object is in the provision of a method of grinding the grooves or slots in the longitudinal edges of a chain saw guide bar, whereby an improved product results in that the surface of the groove has a polished finish—a microfinish—whereby saw chains traversing such grooves have greater life because of the diminished wear thereon, and whereby greater production of guide bars is afforded because of the high speeds—easily between 15 to 35 linear inches per minute as contrasted with the speed of 2 to 3 inches per minute in the standard milling operations.

Yet a further object is in the provision of a method of forming guide bars wherein suitable stock material is first heat treated, is thereafter straightened, and is then contour ground and is grooved along the longitudinal edges by grinding whereby greater regularity in the hardness of the guide bar is attained along with the elimination of brittle areas, etc. Additional objects and advantages will apear as the specification develops.

An embodiment of the invention is illustrated in the accompanying drawings, in which—

Figure 1 is a diagrammatic view illustrating one step in the method of fabricating chain saw guide bars; Figure 1 is a diagrammatic view similar to that of Figure 1, but showing a subsequent step in the fabricating process; Figure 3 is also a diagrammatic view composite in character to show the steps illustrated in Figures 1 and 2 being carried forth along the opposite longitudinal edge of the guide bar; Figure 4 is a broken vertical sectional of the grinding head of the holder utilized in the grinding operations; and Figure 5 is a broken end view in elevation of the apparatus shown in Figure 4, but with the spindle thereof indexed to a contour grind position.

It is believed that the invention will be most readily understood if the apparatus used in carrying out the method steps is first described, and for such description reference will be made to Figures 4 and 5 in particular. This apparatus comprises two primary parts—the head 10 and a holder or clamp 11. The latter unit serves to hold one or more guide bars 12 and 13 in position while the contour grinding discs 14 and 15 and the groove grinding discs 16 and 17 are brought, respectively, into grinding engagement with the guide bars to contour and groove grind the same. Figure 4 illustrates the apparatus in a position wherein the groove grinding discs 16 and 17 are engaging the guide bars 12 and 13 in the forming of grooves therein, while Figure 5 shows the apparatus in its position wherein the contour grinders 14 and 15 are engaging the longitudinal edges of the bars 12 and 13.

The head 10 comprises a support frame or carriage 18 provided with an enlarged opening 19 extending transversely therethrough in which is mounted adjacent one end thereof bearings 20 and 21 that rotatably support a spindle 22 therein that at its right end (not shown) is adapted to be connected to an electric motor or other source of power for rotating the same. At its opposite or left end, the spindle 22 is tapered, as shown at 23, that has a chuck 24 mounted thereon. The chuck is locked against rotational movement with respect to the spindle by a key 25 and is otherwise locked on the tapered end by a nut 26 threadedly received on the threaded tip of the tapered portion 23. The bearings 20 and 21 are locked against a shoulder provided by the frame 18 by means of bolts 27 which are threadedly received within the frame and which prevent rotation of a lock nut 28 which is threadedly received on the spindle 22 and abuts the bearings.

The chuck 24 carries the contour grinding discs 14 and 15 and the groove grinding discs 16 and 17, and supports also a plurality of spacers 29, 30, 31, 32 and 33 which separate the various grinding discs and which lie along the sides of the outermost discs. The spacers and the discs are then readily locked in position by means of a locking member 34 that is drawn tightly thereagainst by means of cap screws 35 which extend therethrough and are threadedly received within the chuck 24. A shield encloses the upper portion of the discs 14 through 17, and the shield is designated generally with the numeral 36. It should be assumed to have depending side walls and a top wall, and is supported by a bracket 37 mounted on the frame 18 by means of cap screws 39.

The head 10 also is equipped with at least two cam rollers or cam followers 40 and 41 (Figures 4 and 5, respectively) that may be rotatably carried by the respective brackets or mounting members 42 and 43. These cam rollers, as will be described more fully hereinafter, are adapted to ride along cams which manipulate the head so as to contour grind and then groove grind the guide bars along the contour. The cam roller 40 controls the groove grinding operation, while the cam roller 41 governs the contour grinding operation.

The holder or clamp assembly 11 comprises a base panel or table portion 44 having a standard or generally vertical member 45 extending upwardly therefrom which defines at its upper end a stationary jaw that may be considered to have jaw portions 46 and 47 along opposite sides thereof for engagement, respectively, with the guide bars 12 and 13. Intermediate the ends of the member 45, it is provided with an opening or passage 48 extending transversely therethrough to permit the free passage of the rods 49 and 50 of the hydraulic cylinders 51 and 52, respectively. The cylinders 51 and 52 are pivotally supported, respectively, in bifurcated brackets 53 and 54 rigidly secured to the table 44 and which cooperate with strips 55 and 56 which serve to clamp the cylinders in the bifurcated brackets.

The cylinders 51 and 52 may be standard units and, for example, could be air cylinders, although preferably hydraulic cylinders are employed. The cylinders may be single-acting whereby when hydraulic pressure is applied thereto, the rods 49 and 50 thereof are pushed outwardly, and when such pressure is removed are spring biased into the initial position. However, they could be double-acting pistons, if such are desired. The rods 49 and 50, respectively, are pivotally connected to arms 57 and 58 that intermediate the ends thereof are pivotally connected in turn to links 59 and 60, respectively, that at their opposite ends are connected pivotally to the respective bifurcated pivot means 61 and 62 rigidly secured to the center standard 45.

The arms 57 and 58 have secured, respectively, thereto mounting members 63 and 64 by means of adjustable bolts and nuts 65, 66 and 67, 68, respectively. It will be apparent from the illustration that the various nuts and bolts can be rotated so as to place the mounting members 63 and 64 closer to or more remote from their respective arms 57 and 58. The mounting members 63 and 64 have the respective jaws 69 and 70 secured thereto by means of the bolts 71 and 72.

It will be noted that a cooling and lubricating system is illustrated in conjunction with the head 10 and clamp assembly 11, and it may be designated generally with the numeral 73. This system includes a pump 74, which may be a gear pump as shown, for pumping oil through the conduits communicating with the nozzles 75 and 76 that are directed, respectively, toward the groove grinding discs 16 and 17 at the points thereof in engagement with the guide bars 12 and 13. A coolant and refrigerant is forced out of the nozzles and onto the discs and guide bars, and is collected in the reservoir 77 defined by the casing 78 enclosing the clamp assembly 11 and a portion of the head 10. The system 73 is in essence a closed system, and liquid accumulating in the reservoir 77 is drawn up by the pump 74 through a conduit 73 and filter 80, which may be a standard magnetic separator for removing metal particles from the lubricant. Preferably, the lubricant is cooled before being again sprayed onto the discs 16 and 17, and the coolant may be evacuated in any manner such as by cooling coils 81 enclosing a portion of the filter 80.

It will be evident that the cylinders 51 and 52 will be connected in a hydraulic system so that they may be energized and deenergized in clamping and releasing guide bars 12 and 13. Figure 4 shows the cylinders 51 and 52 in an energized condition wherein the respective rods 49 and 50 are in extended condition to force their respective arms, mounting members and jaws 69 and 70 into clamping relation with the guide bars and with the stationary jaws 46 and 47. However, the jaw 70 is also illustrated in dotted lines which show it in open position whereby a guide bar 12 may be either inserted or removed.

When guide bars 12 and 13 are clamped in position by the jaws (it may be noted that ordinarily there will be two sets of clamp members, one set at each end of the guide bars), the spindle 22 is rotated so as to rotate the discs 14 through 17. Initially, the head will be positioned as shown in Figure 5 wherein the discs 14 and 15 employed in contour grinding the longitudinal edges of the guide bars are aligned therewith for grinding the same. At this time, the cam roller 41 is engageable with the cam 82 provided by the jaw 69 when in its closed position, such engagement being illustrated in Figure 5. After a pass has been made by the head so as to contour the upper longitudinal edge of each guide bar, there is a lateral indexing into the position illustrated in Figure 4 wherein the grooving discs 16 and 17 are aligned with the guide bars for engagement therewith. At this time the cam roller 40 is in engagement with the cam 83 provided by the jaw 70 when that jaw is in its closed position. As the cam roller rides along the cam 83, it determines the depth of the discs 16 and 17, and thereby contours the groove formed thereby so that it corresponds with the curvature of the bars 12 and 13.

Especially during the grooving operation, liquid is pumped by the gear pump 74 through the jets 75 and 76 so as to completely envelope and exclude air from about the discs 16 and 17 during their grinding engagement with the guide bars. The liquid, as has been explained before, is recirculated after filtration wherein the metal particles are removed therefrom, and after cooling whereby the liquid serves as a coolant for both the grooving discs and guide bars. A relatively large volume of liquid is required for this cooling and air exclusion bath, and ordinarily the liquid will be oil of the character that will have a minimum smoke development and which will extract heat from the guide bars and discs. An oil that has proved useful is Texaco heavy duty oil. There will be some variation in the type and make of the discs 16 and 17, and one type that has been found satisfactory is a disc made by the Carborundum Company, model A–54–R–R–R.

The provision of a constant oil bath is essential for if it is interrupted for a few seconds, it has been found that the discs 16 and 17 will almost immediately break. Also, the large volume of oil serves to flush away metal particles which, if collected along the sides of the discs, would embed themselves therein and cause a glazing that would reduce the cutting capabilities thereof. There will be some volume of smoke development, and this may be vented by any suitable means (not shown).

Figures 1 through 3 illustrate the steps followed in forming a guide bar from a sheet of stock material. As has been brought out before, the material is preferably completely heat treated and straightened, so that following the contouring and slot forming operations, it is a finished product ready for use. After such material is clamped in the holders as heretofore described, a longitudinal edge thereof (designated in Figures 1 through 3 with the numeral 12a) is contoured by passing the contour grinding disc 14 thereover, as shown in Figure 1. This contour grinding operation is accomplished in a single pass, wherein the disc 14 moves from the left to the right (Figure 1). A lateral indexing thereafter aligns the disc 16 with the contoured edge 12a of the guide bar 12, and a groove or slot is then ground therein as the disc moves from right to left (Figure 2). The slot is designated for identification purposes with the numeral 84. One side of the guide bar 12 has now been completed, and it is turned over to bring the edge 12b into position for successive grinding engagement with the contour grinding disc 14 and groove grinding disc 16. The slot or groove formed in the guide bar 12 is designated with the numeral 85 for identification purposes.

It will be appreciated that the head 10 and holder assembly 11 must move with respect to each other so that the entire length of each of the guide bars 12 and 13 is subjected to a grinding operation performed by the discs 14 through 17. Preferably, the head 10 will be supported for such longitudinal movement, and of course it is also supported for vertical movement within the movement limits necessitated by the cams 82 and 83. Since mounting and support arrangements which will be susceptible of such movements are well known in the art, and form no part of this invention per se, they are illustrated and will not be further described.

While in the foregoing specification an embodiment of the invention, both in terms of method and apparatus, has been set forth in considerable detail for purposes of adequately describing the same, it will be apparent to those skilled in the art that numerous changes may be made in those details without departing from the spirit and principles of the invention.

I claim:

1. In the fabrication of a chain saw guide bar, the steps of supporting a heat treated and straightened stock material so as to expose a longitudinal edge thereof, grinding such exposed longitudinal edge to contour the same by controlled movement of a contoured grinding disc longitudinally thereof in one direction, and grinding a slot in such contoured edge by moving a slot grinding disc longitudinally of said contoured edge in the opposite direction, whereby said stock material is contoured and slotted to support a chain saw after heat treatment thereof.

2. The method of contouring and slotting the edge portions of a chain saw guide bar, comprising subjecting an elongated, flat chain saw guide bar after heat treatment and straightening to a series of grinding operations to form longitudinally-extending curved slots therein for slidably supporting a chain saw, in one of said operations the longitudinal edges of said guide bar being contoured with a grinding disc running longitudinally with respect to said edges, in another of said operations the longitudinal edges of said guide bar being slotted with another grinding disc running longitudinally with respect to said edges.

3. In a method of forming a chain saw guide bar from elongated sheet stock having substantially straight longitudinal edges, the steps of heat treating and cooling the stock to temper the same, straightening and flattening the surfaces of the tempered stock, and thereafter subjecting the flat heat-treated stock to a series of grinding operations to form longitudinal and curved slots therein for slidably supporting a chain saw, in one of said operations the longitudinal edges of said stock being contoured with a grinding disk running longitudinally with respect to said edges, in another of said operations the longitudinal edges of said stock being slotted with another grinding disk running longitudinally with respect to said edges.

4. In a method for the fabrication of a chain saw guide bar, the steps of first heat treating and straightening guide bar stock to harden and flatten the same, and thereafter grinding the longitudinal edges of said guide bar stock to contour and groove the same for slidably receiving a chain saw.

References Cited in the file of this patent

UNITED STATES PATENTS

| Number | Name | Date |
|---|---|---|
| 324,600 | Shoemaker | Aug. 18, 1885 |
| 376,814 | Coleman | Jan. 24, 1888 |
| 1,831,412 | Ellenbecker | Nov. 10, 1931 |
| 1,950,758 | Sommer et al. | Mar. 13, 1934 |
| 2,082,020 | Moon | June 1, 1937 |
| 2,163,687 | Jacobsen | June 27, 1939 |
| 2,375,323 | Pizzigoni | May 8, 1945 |